Aug. 11, 1931.  C. R. CLAGHORN  1,818,115
CONVEYER
Filed Oct. 19, 1926   2 Sheets-Sheet 1
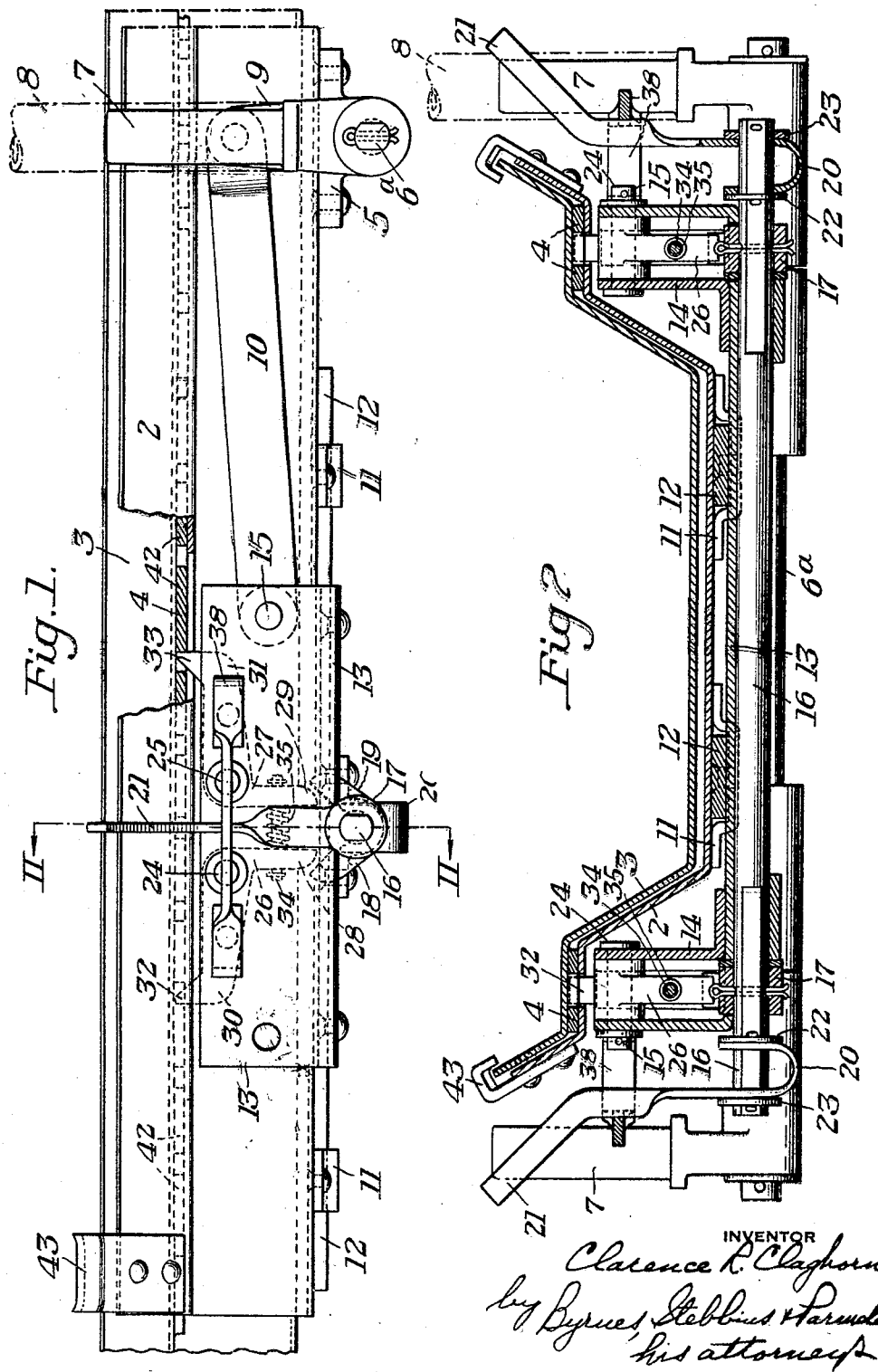
INVENTOR
Clarence R. Claghorn
by Byrnes, Stebbins & Parmelee
his attorneys Aug. 11, 1931.  C. R. CLAGHORN  1,818,115
CONVEYER
Filed Oct. 19, 1926    2 Sheets-Sheet 2
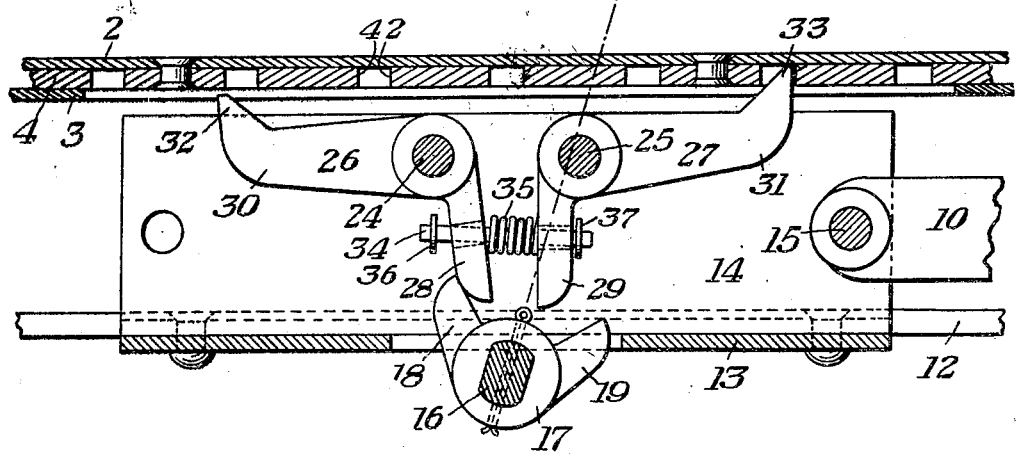
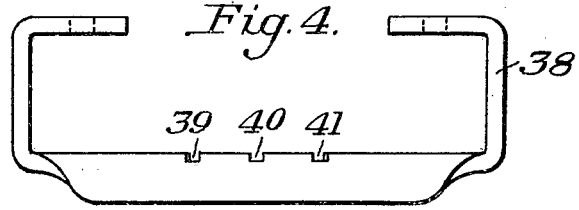
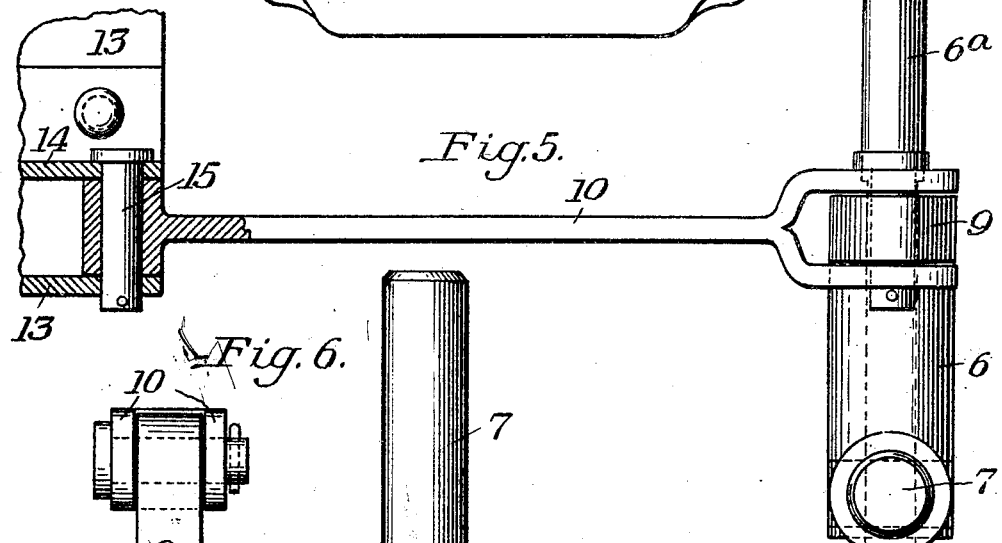
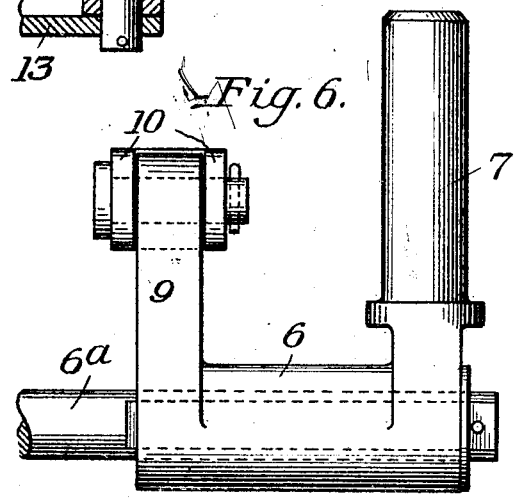
INVENTOR
Clarence R. Claghorn
by Byrnes, Stebbins & Parmelee,
his attorneys Patented Aug. 11, 1931

1,818,115

UNITED STATES PATENT OFFICE

CLARENCE R. CLAGHORN, OF BALTIMORE, MARYLAND

CONVEYER

Application filed October 19, 1926. Serial No. 142,608.

This invention relates to conveyers and particularly to conveyers which may be extended or retracted to suit the conditions of their use.

In the mining of coal, and especially low coal, it is desirable to extend the conveyer as the mining operations advance in order to keep the receiving end of the conveyer as close as possible to the working face of the mine, and to retract the conveyer for allowing the movement of mining machinery therepast or for any other purpose as well as for spreading the conveyer at a mid point for the insertion of conveyer sections when desired.

According to the present invention, I propose to provide a conveyer which may be conveniently extended or retracted at will. According to the present invention, I further propose to provide a novel operating mechanism through which the conveyer can be extended or retracted. The mechanism is of such nature that it can be employed in connection with conveyers of the trough type wherein the entire trough, including the adjustable extension for the conveyer, is reciprocated to effect a forward movement of the coal. Such a conveyer is shown in my copending application, Serial No. 142,607, filed October 19, 1926.

In the accompanying drawings I have illustrated a present preferred form of my invention. In the drawings:

Fig. 1 is a side view of a telescoping trough showing means for moving one section relatively to another;

Fig. 2 is a section taken on the line II—II of Fig. 1;

Fig. 3 is a detail, partly in section, showing the means for engaging the movable trough;

Fig. 4 is a detail showing the frame for maintaining the engaging means in a desired position;

Fig. 5 is a detail, partly in section, showing a portion of the trough moving mechanism; and Fig. 6 is a detail showing the operating lever for moving the movable trough.

I provide a fixed or relatively stationary trough 2 formed so as to contain material to be conveyed. Mounted on the fixed trough is a movable trough 3 adapted to slide longitudinally relatively thereto on strips 4 connected to the movable trough. The fixed trough may be mounted on any suitable base (not shown).

Riveted to the trough section 2 is a bearing 5, in which is mounted for rotation a shaft 6 having connected thereto a lever 7. The lever 7 is of such shape that a pipe 8 may be fitted over it to operate the lever.

Rigidly connected to the shaft 6 is a lever 9 having pivoted thereto at its extremity a link 10. The members 5 to 10 inclusive are identically duplicated on both sides of the trough 2, as shown in Figs. 1 and 2. The two opposite shafts 6 are rigidly connected by an extension 6a so that rotation of either shaft will cause corresponding rotation of the other.

Secured beneath the trough 2 are four brackets 11 arranged in pairs side by side, each bracket being longitudinally aligned with one of the opposite pairs. Each longitudinally aligned pair of brackets serves to guide a rail 12 for slidable movement, as shown in Fig. 2. Riveted to the rails 12 between the pairs of brackets is a U-shaped frame 13 extending under the trough 2 from side to side thereof. It will thus be seen that the frame 13 is adapted to slide longitudinally of the trough 2 by reason of the sliding engagement of the rails 12 with the brackets 11.

Secured near each end of the frame 13 is an angle member 14. Pivoted between the upward extension of the frame 13 and the angle member 14 on each side of the frame, by a pin 15, is the end of the link 10 opposite that pivoted to the lever 9. By moving either or both of the levers 7 by means of the pipes 8, the frame 13 may be moved in either desired direction longitudinally of the trough 2.

Journaled to the frame 13 is a shaft 16, extending beneath the conveyer from one side to the other. The mechanism now to be described is exactly duplicated on both sides of the trough and while the description will be confined to one side only, it will be understood that the same applies to the other side as well. Rigidly connected to the shaft 16 near the outer surface of the frame 13 is a cam 17 having two outwardly extending portions 18 and 19. Also nonrotatably connected to the shaft 16 by means of a U-shaped portion 20 is a lever 21. The opposing sides of the U-shaped portion 20 are contained between two washers 22 and 23 which are maintained in contact therewith by pins passing through the shaft. The U-shaped portion of the lever 21 is made of such material that it will act resiliently so that the upper part or handle may be sprung toward the conveyer a short distance.

Pivoted to the frame 13 at 24 and 25, respectively, are two bell cranks 26 and 27 having downwardly extending oppositely disposed arms 28 and 29, and outwardly extending arms 30 and 31 having at their extremities pawls 32 and 33, respectively. Extending through holes provided in the arms 28 and 29 therefor is a pin 34 having thereon a coiled spring 35 disposed between the arms 28 and 29 and tending to move them apart and consequently to move both of the pawls 32 and 33 upwardly. Washers 36 and 37 are provided on each end of the pin 34 to prevent the arms 28 and 29 from moving away from each other to a greater extent than desired.

The shaft 16 may be rotated in either direction from its mid position, as shown in Fig. 1, by means of the lever 21. If the lever 21 is moved to the right as indicated in Fig. 3, the extension 18 of the cam 17 contacts with the arm 28 of the bell crank 26 to move the arm to the right and thus lower the pawl 32. This also urges the pawl 33 on the bell crank 27 upwardly by reason of the action of the spring 35. Fastened to the frame 13 is a bracket 38 extending around the lever 21 in such a manner that the lever is maintained in contact with the bracket by the action of the U-shaped portion 20 of the lever. In the lever-contacting surface of the bracket 38 are three notches, 39, 40 and 41, respectively, into which a portion of the handle of the lever is adapted to be sprung to maintain the lever in desired positions. When the handle is in the notch 40, the lever is in its mid position as shown in Fig. 1. When the lever is in the position shown in Fig. 3, its handle is in the notch 41. The lever may be moved to the left to a position corresponding to that shown in Fig. 3, in which case its handle will lie in the notch 39. In such position, the pawl 33 is moved downwardly and the pawl 32 is urged upwardly. When the lever is in its mid position both pawls are urged upwardly by the action of the spring 35.

The strip 4 which is connected to the movable trough 3 has portions cut away to provide a series of projections 42 which are spaced apart a distance sufficient to permit the end of the one of the pawls 32 or 33 to enter between them. The pawl 33 in Fig. 3 is shown in engagement with one of said projections 42 while the pawl 32 is shown drawn out of engagement with the projections. As the bell cranks are mounted on the frame 13, when the frame is caused to move to the right by moving the lever 7 in that direction, the movable trough 3 will be moved therewith by reason of the engagement of the pawl 33 with one of the projections 42. After the frame has been moved to the right a distance equivalent to that between one projection and the next, the lever 7 and the frame 13 are moved to the left and the pawl 33 by reason of its beveled surface will ride out of the space between the projections 42, causing the spring 35 to be further compressed, and when the frame has been moved a sufficient distance to the left, will engage the adjacent projection 42 in a manner exactly similar to that in which it engaged the former. By moving the lever 7 alternately to right and left the movable trough 3 can thus be moved to the right any desired distance.

When it is desired to move the trough 3 to the left, the lever 21 is moved to its left hand position and entered into the notch 39. This will cause the pawl 33 to be withdrawn from engagement with a projection 42 and the pawl 32 to move upwardly to engage a projection. A left and right movement of the lever 7 will then cause the movable trough to move toward the left in a manner identical to that in which it is moved to the right. When the lever 21 is in its mid position, both pawls 32 and 33 will be engaged with projections 42 so that movement of the lever 7 will merely cause the trough 3 to be reciprocated back and forth.

In order to prevent the trough 3 from being jarred out of its proper relative position with the trough 2, I provide guides 43 at suitable intervals bolted to the latter and extending over the edge of the movable trough, as shown in Fig. 2.

While the invention is of primary importance in providing an actuating mechanism for positively extending or retracting the forward terminal 3 whereby it may be shoved forward toward the working face of the mine or other loading point, and quickly retracted to permit the passage of mining machinery thereby, it is also possible to hold the terminal 3 against movement and move the adjacent portion of the main conveyer 2. This is of considerable advantage in spreading the main conveyer to permit of the insertion of additional sections therein.

I have shown and described a preferred embodiment of my invention, but it is to be understood that it is not limited to the form shown, but may be otherwise embodied within the scope of the following claims.

I claim:

1. A conveyer comprising a fixed trough, a movable trough mounted for longitudinal movement thereon, and linearly slidable means operably associated with said troughs by which a manual source of power becomes effective for moving said second mentioned trough relatively to said first mentioned trough longitudinally in either direction.

2. A conveyer comprising a fixed trough, a movable trough mounted for longitudinal movement thereon, a lever connected to said fixed trough, and linearly slidable means operably associated with said lever by which a manual source of power becomes effective for moving said movable trough relatively to said fixed trough longitudinally in either direction.

3. A conveyer comprising a fixed trough, a movable trough mounted for longitudinal movement thereon, a lever connected to said fixed trough, a link connected to said lever, a frame connected to said link and longitudinally movable with respect to said fixed trough, and means operably associated with said frame for engaging said movable trough to move it relatively to said fixed trough longitudinally in either direction upon operation of said lever.

4. A conveyer comprising a fixed trough, a movable trough mounted for longtiudinal movement thereon, a frame mounted for longitudinal movement on said fixed trough, means operably associated with said frame for engaging said movable trough to move it relatively to said fixed trough longitudinally in either direction upon movement of said frame, and means for moving said frame.

5. A conveyer comprising a fixed trough, a movable trough mounted for longitudinal movement thereon, a frame mounted for longitudinal movement on said fixed trough, a pawl connected to said frame and movable into and out of engagement with said movable trough, and means for moving said frame.

6. A conveyer comprising a fixed trough, a movable trough mounted for longitudinal movement thereon, a frame mounted for longitudinal movement on said fixed trough, a pawl connected to said frame and movable into and out of engagement with said movable trough for moving it in one direction, a second pawl associated with said frame and movable into and out of engagement with said movable trough for moving it in the opposite direction, and means for moving said frame.

7. A conveyer comprising a fixed trough, a movable trough mounted for longitudinal movement thereon, a frame mounted for longitudinal movement on said fixed trough, a pair of oppositely disposed pawls connected to said frame and selectively movable into and out of engagement with said movable trough for moving it in one direction or the other upon movement of said frame, and means for moving said frame.

8. A conveyer comprising a fixed trough, a movable trough mounted for longitudinal movement thereon, a frame mounted for longitudinal movement on said fixed trough, a bell crank connected to said frame and having a pawl operably associated therewith, means for actuating said bell crank to move said pawl into and out of engagement with said movable trough, and means for moving said frame.

9. A conveyer comprising a fixed trough, a movable trough mounted for longitudinal movement thereon, a frame mounted for longitudinal movement on said fixed trough, a pair of bell cranks connected to said frame, each having a pawl for cooperation with said movable trough, said pawls being opposed to each other, means for selectively moving either bell crank to a position in which the pawl thereof is out of cooperative relation with said movable trough, and means for moving said frame in opposite directions.

10. A conveyer comprising a fixed trough, a movable trough mounted for longitudinal movement thereon, a frame mounted for longitudinal movement on said fixed trough, a pair of bell cranks pivoted to said frame each having a pawl for cooperation with said movable trough, a cam operably associated with said frame for selectively rendering either pawl inoperative to effect movement of the movable trough in a desired direction, and means for moving said frame.

11. A conveyer comprising a fixed trough, a movable trough mounted for longitudinal movement thereon, a series of projections on said movable trough, a frame mounted for longitudinal movement on said fixed trough, a pawl operably associated with said frame and movable into and out of position to engage one of said projections so as to move said movable trough upon movement of said frame, and means for moving said frame.

12. A conveyer comprising a fixed trough, a movable trough mounted for longitudinal movement thereon, a series of projections on said movable trough, a frame mounted for longitudinal movement on said fixed trough, a pair of opposed pawls operably associated with said frame, one of which is movable into and out of the path of said projections to move said movable trough in one direction and the other movable into and out of the path of said projections to move said movable trough in the opposite direction upon movement of said frame, and means for moving said frame.

13. A conveyer comprising a fixed trough, a movable trough mounted for longitudinal movement thereon, a series of projections on said movable trough, a frame mounted for longitudinal movement on said fixed trough, a pair of bell cranks pivoted to said frame, one of said bell cranks having means thereon for engaging said projections to move said movable trough in one direction and the other having means thereon for engaging another of said projections to move said movable trough in the opposite direction upon movement of said frame, means for actuating said bell cranks, and means for moving said frame.

14. A conveyer comprising a fixed trough, a movable trough mounted for longitudinal movement thereon, a series of projections on said fixed trough, a frame mounted for longitudinal movement on said fixed trough, a pair of bell cranks pivoted to said frame, one of said bell cranks having means thereon for engaging said projections to move said movable trough in one direction and the other having means thereon for engaging said projections to move said movable trough in the opposite direction upon movement of said frame, a cam associated with said frame for actuating said bell cranks, a lever for controlling said cam, and means for moving said frame.

15. A conveyer comprising a fixed trough, a movable trough mounted for longitudinal movement thereon, a frame mounted for longitudinal movement on said fixed trough, a pair of oppositely disposed bell cranks connected to said frame having arms lying side by side, each bell crank having a pawl thereon for engagement with said movable trough, means for engaging an arm of either bell crank as desired to hold a pawl out of engagement with said movable trough so that the other pawl will be operative for moving said movable trough on movement of said frame, and means for moving said frame.

16. A conveyer comprising a fixed trough, a movable trough mounted for longitudinal movement thereon, a frame mounted for longitudinal movement on said fixed trough, a pair of oppositely disposed bell cranks connected to said frame having arms lying side by side, a spring interposed between said arms to hold them apart, a pawl on each of said bell cranks for engagement with said moveable trough, means for engaging an arm of either bell crank as desired to hold a pawl out of engagement with said movable through so that the other pawl will be operative for moving said movable trough on movement of said frame, and means for moving said frame.

17. A conveyor comprising a fixed trough, a movable trough mounted for longitudinal movement thereon, a frame mounted for longitudinal movement on said fixed trough for moving said movable trough, oppositely disposed connecting means on said frame each effective for moving said movable trough in one direction only, and means for selectively actuating a desired one of said connecting means for engaging said movable trough.

18. A conveyer comprising a fixed trough, a movable trough mounted for longitudinal movement thereon, a frame mounted for longitudinal movement on said fixed trough, a bell crank connected to said frame having a finger adapted to engage said movable trough for moving it upon movement of said frame, and means for holding said finger out of operative relation with said movable trough.

19. The combination with telescoping conveyer trough sections, of a reciprocable pawl carrying member on one section, oppositely disposed pawls thereon, means for rendering one or the other of such pawls operable at will, and means on the other section for cooperation with the pawls.

20. The combination with telescoping conveyer trough sections, of a linearly reciprocable pawl carrying member, opposed pawls thereon, means on one of the trough sections for cooperation with the pawls, and means for selectively operating the pawls.

21. The combination with telescoping conveyer trough sections, of a reciprocable pawl carrying member, opposed pawls thereon, means on one of the trough sections for engagement with the pawls, means for selectively operating the pawls, and a crank for operating the reciprocable pawl carrying member.

22. A conveyer comprising fixed and movable troughs, linearly slidable means adapted to engage the movable trough to move it relatively to the fixed trough, and means connected with the fixed trough for moving such linearly slidable means.

23. A conveyer comprising fixed and movable troughs, slidable means adapted to engage the movable trough to move it relatively to the fixed trough, and link and lever means for moving such slidable means.

In testimony whereof I have hereunto set my hand.

CLARENCE R. CLAGHORN.